Sept. 16, 1924.
W. B. CLARKSON
AUTOMATIC ARC WELDING CONTROL SYSTEM
Filed Dec. 22, 1923
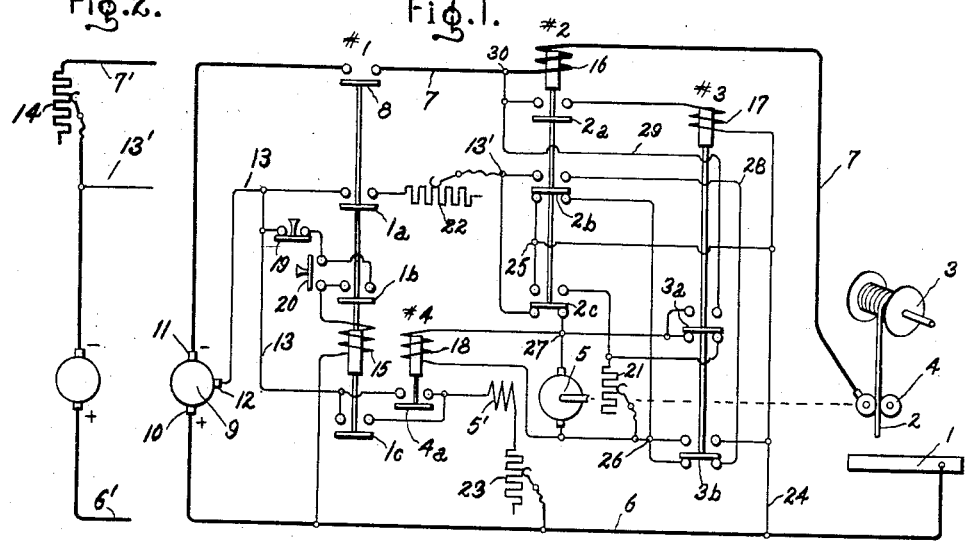
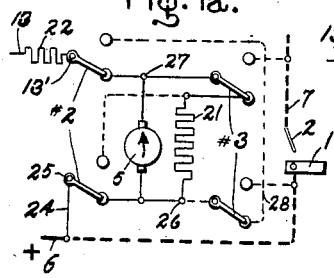
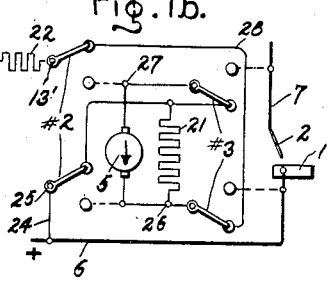
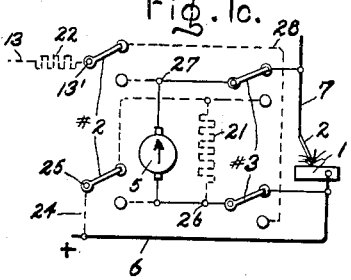
Inventor:
William B. Clarkson,
by
His Attorney.

Patented Sept. 16, 1924.

1,508,746

UNITED STATES PATENT OFFICE.

WILLIAM B. CLARKSON, OF SCHENECTADY, NEW YORK, ASSIGNOR TO GENERAL ELECTRIC COMPANY, A CORPORATION OF NEW YORK.

AUTOMATIC ARC-WELDING CONTROL SYSTEM.

Application filed December 22, 1923. Serial No. 682,341.

*To all whom it may concern:*

Be it known that I, WILLIAM B. CLARKSON, a citizen of the United States, residing at Schenectady, county of Schenectady, State of New York, have invented certain new and useful Improvements in Automatic Arc-Welding Control Systems, of which the following is a specification.

My invention relates to electric arc welding of the type wherein the arc is maintained between the work constituting one electrode and a welding pencil constituting the other electrode, and more particularly to arrangement of control apparatus for automatically striking the arc.

While my invention is particularly intended for arc welding systems in which a metallic pencil or welding electrode is used, it is also applicable to systems wherein a carbon or other non-metallic pencil is used.

An object of my invention is to provide an improved arrangement of control apparatus for controlling a reversible electric motor arranged to operate feeding mechanism to move the welding electrode or pencil into contact with the work, reverse the motor to withdraw the pencil from the work to strike the arc and again reverse the motor when the arc has been established so that the welding pencil will be then fed toward the work to maintain the arc. A further object of my invention is to provide an improved circuit controlling arrangement which will prevent the motor from coasting to jam the electrode against the work when the welding circuit is interrupted.

My invention will be better understood from the following description taken in connection with the accompanying drawing, and its scope will be pointed out in the appended claims.

Referring to the drawing, Fig. 1 diagrammatically illustrates a welding system embodying my invention; Fig. 2 illustrates how my invention may be used with a different type of supply circuit for furnishing the welding current; Fig. 1ª, Fig. 1ᵇ, and Fig. 1ᶜ are circuit diagrams showing the connection of the electrode feed motor during different phases of the arc striking and maintaining operation.

Referring to Fig. 1, the welding arc is struck and maintained between the work 1 and the electrode 2, which is represented as a metallic electrode fed from the reel 3. The means for feeding the electrode is represented as consisting of feed rolls 4 operated through suitable gearing from an electric motor 5, provided with a field winding 5'. The work is represented as connected to the positive terminal of a source of supply by the main 6. The welding electrode 2 is shown connected to the negative terminal of the source of supply by the main 7 and switch 8. The source of welding current is represented as a three-brush generator 9, the positive brush 10 being connected to the main 6 and the negative brush 11 to the main 7. The third brush 12 is connected to the negative side 13 of a control circuit, the positive side of which is the main 6.

The generator 9 shown in Fig. 1 is a type of generator in which the voltage between the brushes 10 and 12 is at all times substantially constant while the voltage between the brushes 10 and 11 varies in accordance with the current flowing through the electrodes, so that these brushes may be connected directly to the welding electrode without the intervention of any series stabilizing resistance or its equivalent. A series reactance may be used as is well known in the art. A three-brush generator of this type is disclosed in the United States Letters Patent to Sven R. Bergman, No. 1,340,004, May 11, 1920. This type of generator is illustrated in Fig. 1, as it affords a convenient source of constant voltage between the brushes 10 and 12, but it will be obvious to those skilled in the art that the constant voltage may be obtained from any suitable source. It is common in the art to supply an arc from a constant voltage source through a series stabilizing resistor which may be adjusted to permit the flow of any desired welding current. The arrangement in Fig. 1 can be supplied from such a source as indicated in Fig. 2, wherein the voltage between mains 6' and 13' is constant and wherein the main 7' is connected to the generator through the stabilizing resistor 14.

The various circuits are controlled in the arrangement of Fig. 1 by four contactors. Contactor #1 is controlled by an operating coil 15 and this contactor, in addition to the switch 8, is provided with contacts 1ª, 1ᵇ, and 1ᶜ. Contactor #2 is controlled by a coil 16 in series with the electrodes and is provided with contacts 2ª, 2ᵇ and 2ᶜ. Contactor #3 is controlled by a shunt coil 17, the circuit of which is controlled by the contact 2ᵃ of contactor #2. Contactor #3 is provided with contacts 3ᵃ and 3ᵇ. Contactor #4 is controlled by a coil 18 in shunt to the armature of the electrode feed motor 5 and is provided with a contact 4ᵃ which, when closed, shunts the contact 1ᶜ of contactor #1. A normally closed push button 19 and a normally open push button 20 are provided for controlling contactor #1. Resistors 21, 22 and 23 are provided for purposes which will be pointed out in the following description of the operation of the system.

The operation of the system shown in Fig. 1 is as follows: When the operator desires to begin welding, push button 20 is closed. This energizes coil 15 of contactor #1 through a circuit leading from main 6 through coil 15, push buttons 20 and 19 to the other side 13 of the constant voltage control circuit. Contactor #1, therefore, picks up and closes switch 8 to connect the welding electrodes to the source, and closes contacts 1ᵃ, 1ᵇ and 1ᶜ. Contact 1ᵇ closes the circuit around push button 20 so that coil 15 remains energized when the operator releases push button 20. Contact 1ᶜ completes the circuit of the field winding 5' of the motor from main 6 through resistor 23, winding 5', contact 1ᶜ to control main 13. Contact 1ᵃ completes a circuit for operating the electrode feed motor 5 in a direction to feed the welding electrode 2 into contact with the work. This circuit leads from main 6 through lead 24 to point 25, which is always at the potential of positive main 6, through contact 2ᵇ of contactor #2 to point 26, through the armature of the motor 5 to point 27. Current also flows in parallel to the motor armature from point 26 through resistor 21, contact 3ᵃ of contactor #3 to point 27. The circuit is completed from point 27 through contact 2ᶜ of contactor #2 to point 13' which is connected through the resistor 22 and contact 1ᵃ to control main 13. The motor now operates to feed the electrode 2 toward and into engagement with the work, but it will be observed that the motor is supplied from constant voltage mains and is not connected across the arc. The connections for this phase of operation may be seen at a glance from Fig. 1ᵃ, wherein the contacts of contactors #2 and #3, which control the motor connections, are indicated more simply. The circuits in which current flows are shown in full lines in Fig. 1ᵃ and the circuits in which no current flows are shown in dotted lines. It will be seen at once that current flows from point 25 to point 26 and up through the motor armature and resistor 21 in parallel to point 27 through resistor 22 to control main 13. The resistor 21 being in parallel with the motor armature and the resistor 22 in series therewith, the motor operates at a slow and steady speed.

As soon as the electrode 2 engages the work, the series coil 16 of contactor #2 is energized and contactor #2 picks up. Contact 2ᵃ of contactor #2 completes the circuit of coil 17 of contactor #3, but contactor #3 does not pick up at this time for the reason that it is short circuited through the electrodes. The energization of contactor #2 completes a circuit across the constant voltage control mains for reversing the electrode feed motor to withdraw the electrode 2 from the work to establish the arc. This circuit leads from main 6 through lead 24 to point 25, contact 2ᶜ of contactor #2, through the resistor 21 to point 26. Current also flows through contacts 2ᶜ and 3ᵃ to point 27 and through the motor armature to point 26. The circuit is completed from point 26 through contact 3ᵇ of contactor #3, lead 28 and contact 2ᵇ of contactor #2 to point 13' and through the resistor 22 and contact 1ᵃ to control main 13. This phase of operation is shown in Fig. 1ᵇ, from which it is seen at a glance that current flows from main 6 down through the motor armature and resistor 21 in parallel through the lead 28 to the resistor 22 to control main 13. It will be observed that there is still no circuit for the electrode feed motor across the arc. It will also be observed that the same resistors 21 and 22 are used for controlling the operating characteristics of the feed motor during reversing as were used during the phase of operation shown in Fig. 1ᵃ. Since the same mains are used for supplying the motor in both directions of operation and neither the motor nor the risistor is connected across the welding electrodes, the resistor 21 can be left connected across the armature by contactor #3 throughout the arc striking operation and the same resistor 22 can be used during the forward and backward feeding operations.

The voltage across the arc, established when electrode 2 is withdrawn from the work, varies sensitively with the arc length, and contactor #3, the coil 17 of which is connected across the arc through contact 2ᵃ of contactor #2, is arranged to pick up at a predetermined arc voltage. The picking up of contactor #3 connects the armature of the electrode feed motor across the arc for operation in a direction to feed the electrode 2 toward the work to maintain the arc. The circuit for the motor armature leads from the main 6 through lead 24, contact 3ᵇ of contactor #3 to point 26, through the motor armature to point 27, thence through contact 3ᵃ of contactor #3 and lead 29 to point 30 on the main 7, which point is substantially at the potential of electrode 2, since the series coil 16 of contactor #2 is a low resistance coil. Resistor 21 is no longer connected in shunt to the motor armature since the circuit through this resistor across the motor armature was opened by the contact 3ᵃ of contactor #3. The circuit for the motor armature in shunt to the arc during this phase of operation which is the welding operation may be seen at a glance from Fig. 1ᶜ wherein it is seen that point 26 is connected to the work and point 27 to the electrode 2 by contactor #3 and that the current flows from point 26 up through the armature to point 27.

During welding the electrode 2 wears away slowly where a carbon electrode is used, and fuses rapidly and is deposited on the work where a metallic electrode is used. Any tendency of the arc to lengthen, increases the voltage applied to the armature of the electrode feed motor which speeds up to restore the arc length, while any tendency of the arc to shorten, decreases the voltage applied to the armature of the feed motor which slows down to restore the arc length. The arc is, therefore, maintained at substantially constant length during welding.

If, during welding, the arc should be interrupted for any cause, contactor #2 will drop out almost instantly, owing to the deenergization of the coil 16. The dropping out of contactor #2 will open contact 2ᵃ to deenergize and drop out contactor #3. With contactors #2 and #3 out, the circuit shown in Fig. 1ᵃ will be completed to feed the welding pencil into contact with the work to restrike the arc as heretofore set forth. If, during welding, the welding pencil should short circuit upon the work, contactor #3 will drop out but contactor #2 will remain energized. The circuit shown in Fig. 1ᵇ will therefore be established to withdraw the pencil from the work and restrike the arc, as heretofore set forth.

While I have illustrated the operating winding 16 of contactor #2 as a coil directly in series in the lead 7 in Fig. 1, this coil may in constant potential series resistor systems be replaced by a shunt type coil connected in parallel with the resistor; in other words, in parallel with the resistor 14 of Fig. 2. It is apparent that a coil in shunt to the resistor will act in the same way as the coil 16 of contactor #2, since in each case the energization or deenergization of the coil will depend upon whether or not current is flowing in the electrode circuit. With such an arrangement, when the electrodes are separated and the arc is out, there is no voltage drop across the series resistor. The contactor will, therefore, be deenergized just as the coil 16 of Fig. 1 is deenergized. When the electrodes engage, the contactor will be energized. The use of a coil in shunt to the series resistor has a slight advantage over a simple coil in series with the electrodes for the reason that adjustment of the series resistor to vary the welding current does not change the energization of the coil. Where a simple series coil is used, the number of turns on the coil should ordinarily be varied where wide adjustments in welding current are made, but no such adjustment need be made where the series relation between the contactor operating coil and the welding circuit is produced by arranging the coil in shunt to the series resistor. This will be apparent from the fact that the arc voltage depends on the length of the arc and is substantially independent of the current through the arc. Therefore, if the current is changed by a mere adjustment of the resistor, the source voltage and arc length being unchanged, the voltage drop across the resistor remains unchanged. If an adjustment is also made for a different source voltage or a different arc length the voltage across the resistor will be changed but the change is negligible as far as its effect upon the contactor operation is concerned. The voltage across the resistor of course changes with changes in current due to any change in arc length during welding, but changes thus produced in the energization of the contactor simply correspond to the changes of energization which take place in a simple series coil and have no effect on the contactor which simply picks up or drops out in accordance with whether the circuit through the electrodes is closed or open.

Means are customarily provided in arc welding systems for traversing the arc along the joint to be welded. Such traversing may be secured by moving the electrode over the work or by moving the work under the electrode. Such traversing motion may be effected manually, but, where a completely automatic machine is used, means are ordinarily provided for starting the traversing motion as soon as a proper welding arc has been established. Since such traversing means form no part of my invention it need not be specifically described.

A further feature of my invention resides in an improved arrangement for preventing coasting of the electrode feed motor whenever the welding circuit is interrupted. If the electrode feed motor is not braked as soon as the welding circuit is interrupted the motor tends to coast by reason of its inertia and may jam the welding electrode against the work. This is undesirable where any type of electrode is used and may cause the hot electrode to be butt welded against the work where a metallic electrode is used. It has been pointed out that when, during welding, the circuit is interrupted at the electrodes by the breaking of the arc, a circuit is at once established for reversing the motor to restrike the arc, as shown in Fig. 1ᵇ. When, however, the welding circuit is interrupted by deenergizing contactor #1 to open the line switch 8, contact 1ª opens the control main 13 so that the reversing circuit is broken and while resistor 21 is connected in shunt to the motor armature and exerts a dynamic braking effect to stop the motor as long as the motor field winding is energized, such braking effect quickly disappears unless the field winding 5' of the motor is kept energized. My control arrangement, when the push buttons are operated to stop welding, opens the field circuit of the feed motor so that no separate control means need be operated to prevent waste of current through the motor field winding but, to provide for the continuance of dynamic braking, I provide contactor #4, which maintains the field circuit of the motor energized until the motor has stopped. This operation of the contactor #4 will now be described.

To stop welding the operator opens normally closed push button 19. This deenergizes coil 15 of contactor #1, which drops out, opening the line switch 8 and opening contact 1ᶜ. The circuit of the motor field winding 5' is maintained energized, however, notwithstanding the opening of contact 1ᶜ by means of contact 4ª of contactor #4, the coil 18 of which is connected across the armature of motor 5. With this arrangement, when contactors #2 and #3 are deenergized, due to the opening of contactor #1, contactor 3ª of contactor #3 completes the circuit of resistor 21 in parallel with the motor armature. A strong dynamic braking current flows through the resistor 21 as long as field winding 5' remains energized. This stops the motor very quickly and the counterelectromotive force of the motor disappears deenergizing contactor #4, which opens contact 4ª and opens the circuit of field winding 5' so that this field winding is deenergized only after the feed motor has been brought to a stop. Coasting of the electrode into contact with the work is therefore prevented. It will be observed that the opening of push button 19 has opened not only the connection to the main 7 but also all of the control circuits.

The idea of using series and shunt contactors for controlling the operation of an electrode feed motor is disclosed and claimed in the copending application of Eugene R. Carichoff, Serial No. 680,728, filed December 14, 1923, for electric arc welding, assigned to the same assignee as the present application.

While I have shown the electrode feed motor arranged to be connected in shunt to the arc to maintain the arc length substantially constant during welding, it is to be understood that my control mechanism may be used where the motor is connected across a constant voltage source during welding.

For carbon arc welding, the welding pencil consumes so slowly that such an arrangement is satisfactory where the contour of the work is not too variable. The speed of the motor may be adjusted manually whenever desired, as for example by adjusting the resistor 23 in the circuit of the motor field winding 5'. For metallic arc welding, if the electrode feed motor is driven at constant speed, the speed of the motor must be adjusted quite accurately for the work in hand. When adjusted sufficiently accurately, welding may be satisfactorily done since any shortening of the arc increases the current which is supplied by the source so that the electrode fuses off more rapidly, while any lengthening of the arc decreases the current supplied by the source so that the electrode fuses off more slowly, thereby maintaining the arc length sufficiently constant as is well known in the art. It will also be understood by those skilled in the art that whether the motor armature is connected across the arc or supplied from a constant voltage source the motor field winding may be regulated to control the speed of the motor in response to variations in the arc length. Such arrangements are now well known in the art. Such an arrangement is shown in the copending application of Paul O. Noble, Serial No. 323,170, filed September 11, 1919, for methods and apparatus for electric arc welding, assigned to the same assignee as the present application. The arrangement just referred to is also disclosed in British Patent No. 139,919 to the British Thomson Houston Company.

What I claim as new and desire to secure by Letters Patent, is:—

1. An arc welding system of the type wherein the welding arc is maintained between the work constituting one electrode and a welding pencil constituting the other electrode, and wherein an electric motor is provided for feeding the pencil, and wherein a dynamic braking circuit is provided for stopping the motor, characterized by the fact that circuit controlling means connected to be operated in accordance with the counter-electromotive force of the motor is provided for controlling the circuit of the motor field winding for the purpose described.

2. In an arc welding system of the type wherein the welding arc is maintained between the work constituting one electrode and a welding pencil constituting the other electrode, the combination of an electric motor for feeding the pencil, means responsive to the condition of the arc for connecting a dynamic braking circuit in parallel with the motor armature when the current through the arc is interrupted, and means for controlling the motor field circuit comprising a winding in shunt to the motor armature for maintaining the motor field energized to prevent coasting of the pencil into contact with the work when the current through the arc is interrupted.

3. In an arc welding system of the type wherein the welding arc is maintained between the work constituting one electrode and a welding pencil constituting the other electrode, the combination of an electric motor for feeding the pencil, circuit controlling means whereby the electrodes may be connected to a source of welding current and whereby the motor field winding may be connected to a source of supply, means responsive to the condition of the arc for connecting a dynamic braking circuit in parallel with the motor armature when the current through the arc is interrupted, and a contactor comprising a winding connected in shunt with the motor armature arranged to maintain the motor field energized independently of said circuit controlling means whereby upon operation of the circuit controlling means to break the circuits controlled thereby the motor is stopped before the motor field circuit is opened.

4. In an electric control system, a motor, circuit controlling means whereby the motor armature may be connected to a source of supply and whereby the motor field winding may be connected to a source of supply, a dynamic braking circuit for said motor, and a contactor comprising a winding connected in shunt with the motor armature arranged to maintain the circuit of the motor field winding independently of said circuit controlling means when the contactor is energized whereby dynamic braking is effective to stop the motor after said circuit controlling means is operated to open circuit position.

5. An arc welding system of the type wherein the welding arc is maintained between the work constituting one electrode and a welding pencil constituting the other electrode, and wherein a source of current is provided for supplying the welding current to the electrodes comprising a source of substantially constant voltage, a reversible electric motor for feeding the pencil toward and away from the work to strike the arc and toward the work to maintain the arc, and circuit controlling means responsive to the condition of the arc for controlling the direction of operation of the motor arranged to connect the motor to said constant voltage source to feed the pencil toward the work when the arc is broken and to withdraw the pencil from the work when the electrodes engage and to connect the motor in shunt to the arc when the welding arc is established.

6. An arc welding system of the type wherein the welding arc is maintained between the work constituting one electrode and a welding pencil constituting the other electrode comprising a substantially constant voltage control circuit, a reversible electric motor for feeding the pencil, a contactor for controlling the motor connections comprising a winding in series with the electrodes arranged when deenergized to connect the motor to said control circuit for operation in a direction to feed the pencil into engagement with the work and when energized, upon engagement of the electrodes, to connect the motor to said control circuit for operation in a direction to withdraw the pencil from the work to strike the arc, and means provided with a winding responsive to the voltage of the arc for again reversing the direction of feed of the pencil when the arc has been established whereby the motor then operates to feed the pencil to maintain the arc.

7. An arc welding system as claimed in claim 6 comprising a pair of resistors one of which is in series with the control circuit and the other of which is connected in shunt to the motor armature throughout the arc striking operation.

8. An arc welding system of the type wherein the welding arc is maintained between the work constituting one electrode and a welding pencil constituting the other electrode, comprising a substantially constant voltage control circuit, a reversible electric motor for feeding the pencil toward and away from the work to strike the arc and toward the work to maintain the arc, a resistor in series with said control circuit, a resistor in shunt with the motor armature, a contactor for controlling the connections between the motor and the control circuit comprising a winding in series with the electrodes arranged when deenergized to connect the motor to the control circuit for operation in a direction to feed the pencil into engagement with the work and when energized, upon engagement of the electrodes, to connect the motor to the control circuit for operation in a direction to withdraw the pencil from the work to strike the arc, means responsive to arc voltage for disconnecting the motor from the control circuit and connecting it across the electrodes for operation in a direction to fed the pencil toward the work to maintain the arc when the arc has been established and means controlled by said arc voltage responsive means to disconnect said shunt resistor from the motor armature when the motor is connected across the electrodes.

In witness whereof, I have hereunto set hand this 21st day of December, 1923.

WILLIAM B. CLARKSON.